Dec. 3, 1957  K. E. NOFFSINGER  2,815,138
TRACTIVE VEHICLE MOUNTED BUCKET
Filed Sept. 16, 1953  4 Sheets-Sheet 1
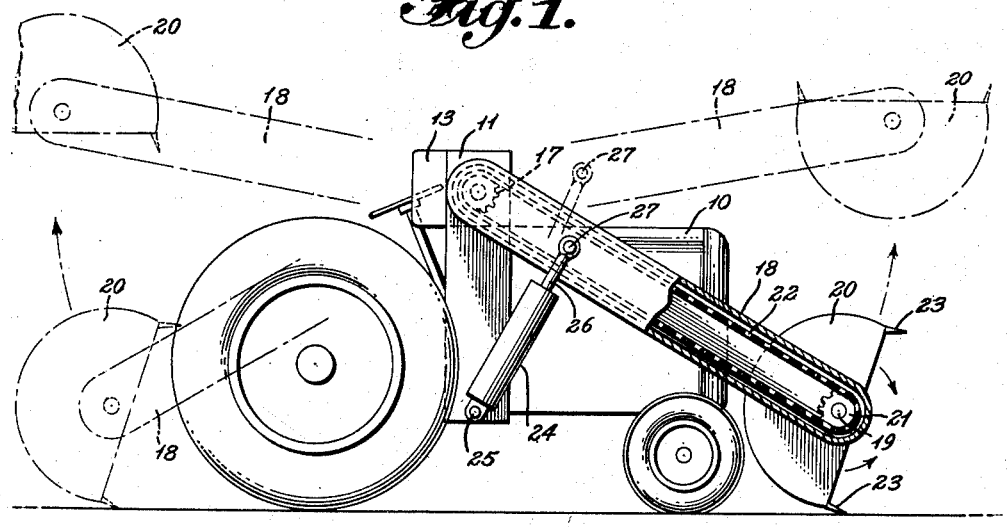
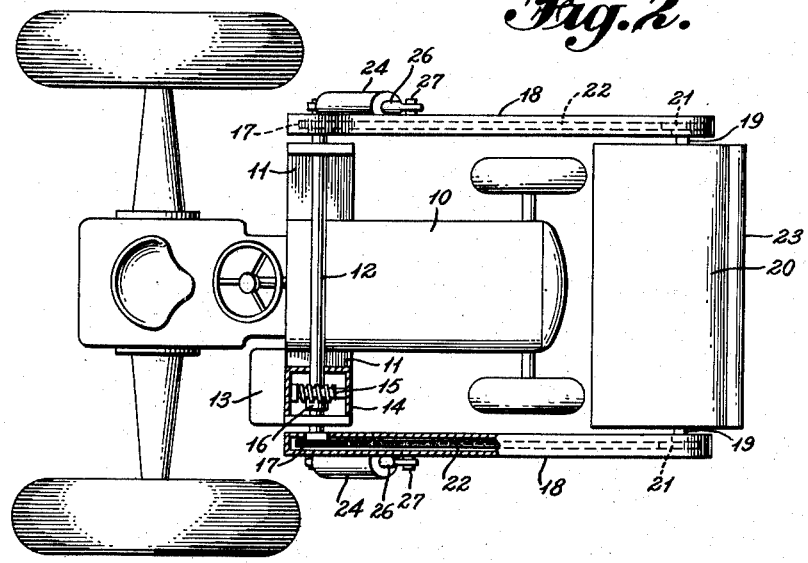
INVENTOR
*Kenna Noffsinger*
BY
ATTORNEY Dec. 3, 1957  K. E. NOFFSINGER  2,815,138
TRACTIVE VEHICLE MOUNTED BUCKET
Filed Sept. 16, 1953  4 Sheets-Sheet 2

INVENTOR
Kenna Noffsinger

BY *Stevens, Davis, Miller & Mosher*

ATTORNEY

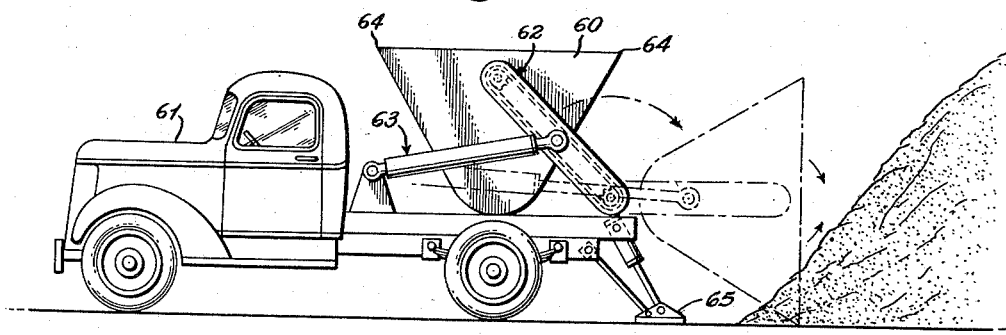
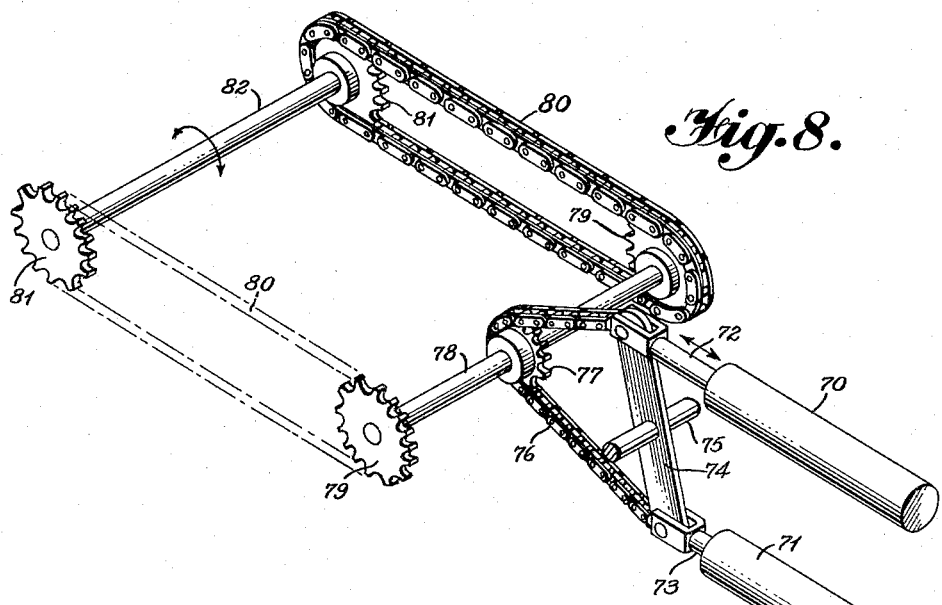
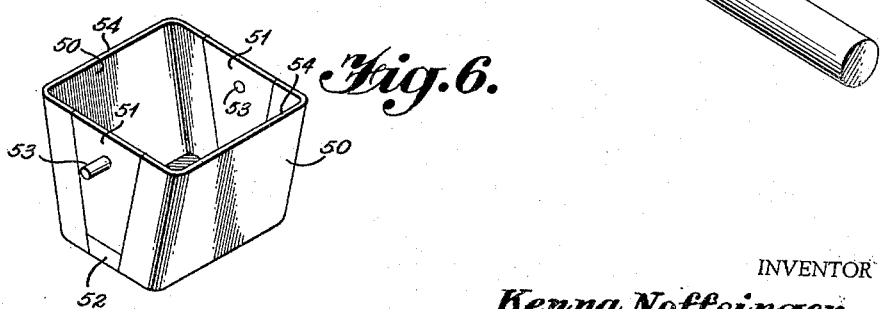

Dec. 3, 1957 K. E. NOFFSINGER 2,815,138
TRACTIVE VEHICLE MOUNTED BUCKET
Filed Sept. 16, 1953 4 Sheets-Sheet 4

INVENTOR
*Kenna Noffsinger*

BY *Stevens, Davis, Miller & Mosher*
ATTORNEY

United States Patent Office 2,815,138
Patented Dec. 3, 1957

2,815,138

TRACTIVE VEHICLE MOUNTED BUCKET

Kenna E. Noffsinger, Red House, W. Va.

Application September 16, 1953, Serial No. 380,498

3 Claims. (Cl. 214—140)

This invention relates to material handling apparatus to be used in combination with a self-propelled tractive vehicle of either the wheeled or crawler type. More particularly this invention relates to material handling apparatus of the type including a bucket or scoop positioned on a tractive vehicle through the agency of arms.

It is accordingly an object of the present invention to provide material handling apparatus to be used in combination with a self-propelled tractive vehicle of either the wheeled or crawler type for earth moving, digging and handling or for loading and dumping other materials such as sand, gravel, etc. The applications of the apparatus of the present invention are not limited to the materials specifically mentioned but include the moving, handling, digging and carrying of a variety of materials.

It is a further object of the present invention to provide apparatus to be used in combination with a self-propelled tractive vehicle which includes a revolving bucket or scoop positioned with respect to the tractive vehicle by a pair of arms. The bucket is driven independently of the means employed to drive the pair of arms and is arranged to be capable of executing a complete revolution. By virtue of this unique construction, the apparatus can be combined with a relatively light tractive vehicle and when so combined is capable of doing work which heretofore could only be done by relatively larger and heavier tractive vehicles. The foregoing advantageous features of the present invention are achieved since the digging action of the revolving bucket does not depend entirely upon the pulling or pushing power of the tractive vehicle on which it is mounted, as is the case with prior constructions.

It is a still further object of the present invention to provide apparatus to be used in combination with a tractive vehicle which can be in the form of either a readily detachable attachment or a permanent part of the tractive vehicle. In either event it is contemplated that the apparatus be mounted on the front or rear of the tractive vehicle. In larger outfits the apparatus can be arranged to pass over the top of the tractive vehicle thus providing added versatility by being able to operate at either the front or rear of the tractive vehicle; whereas in smaller outfits as would be used with a garden tractor, for example, and in which a bucket lifting means would not be feasible, the bucket can be equipped with one, two, or more wheels, such as caster wheels, mounted on its bottom so that when in its upright position it can be transported with great ease.

Other objects and advantages of the present invention, of which there are many, will become readily apparent from a detailed consideration of the following description when taken in conjunction with the appended drawings, in which:

Figure 1 is a view in side elevation partly broken away showing the apparatus of the present invention;

Figure 2 is a view in top plan of the apparatus shown in Figure 1;

Figure 6 is a view in perspective showing the bucket of Figure 5 assembled;

Figure 7 is a view in side elevation showing the apparatus of the present invention arranged with a truck to form a self loading dump truck;

Figure 8 is a view in perspective showing a mechanism for controlling the rotation of the bucket;

Figure 3:
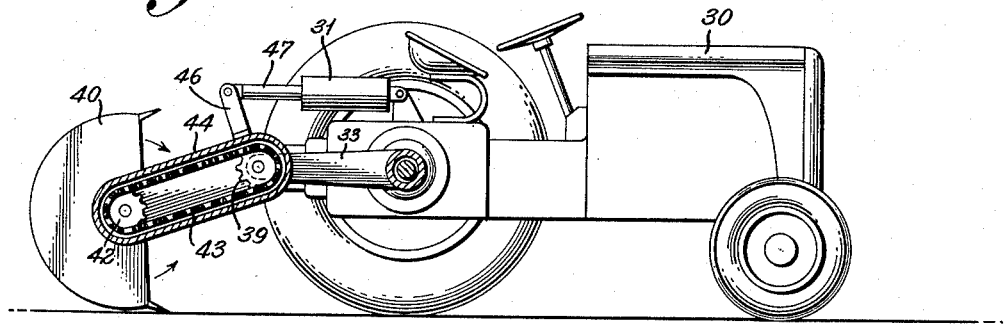
Figure 3 is a view in side elevation partly broken away showing how the apparatus of the present invention can be readily mounted to a farm type tractor in a way to make use of the conventional lifts and power take-offs.

Referring now to the drawings, Figures 1 and 2 show the apparatus of the present invention as applied to a tractive vehicle 10. A pair of brackets 11 are detachably mounted on opposite sides of the tractive vehicle 10 by suitable means. A shaft 12 extends between the two brackets 11 and is bearing-supported in the two brackets 11. A motor 13 is mounted to the frame of the tractive vehicle 10 and the output shaft of the motor 13 projects into a housing 14 and carries at the end thereof a worm gear 15. A spider worm gear 16 fixed to the shaft 12 is in meshing engagement with the worm 15. Thus, by the abovedescribed arrangement, operation of the motor 13 results in rotation of the shaft 12 by motion being transmitted through the gears 15 and 16. Each end of the shaft 12 projects through its respective bracket 11 and has fixed on each end a sprocket wheel 17. Pivotally supported on each end of the shaft 12 is an arm 18 characterized by a hollow interior. The other ends of the arms 18 are pivotally supported on shafts 19 fixed to opposite sides of a bucket 20. Fixed to the ends of the shafts 19 are sprocket wheels 21. The sprocket wheels 17 and 21 on each side of the tractive vehicle 10 are mechanically connected by means of an endless chain 22. The sprocket wheels 17 and 21 and chains 22 are housed in the hollow interior of arms 18. Although no means are shown to adjust the bearings to keep the chains 22 tight, it will be appreciated that suitable provisions readily suggest themselves to persons skilled in the art.

In operation the motor 13 results in rotation of the shaft 12 as previously described. Upon rotation of the shaft 12, the sprocket wheels on each end of the shaft 12 are also caused to rotate thereby producing a movement of the endless chains 22 which transmits the rotary motion to the sprockets 21 fixed to the ends of the shafts 19. Since the bucket 20 is rigidly fixed between the shafts 19, rotary movement of the sprockets 21 and shafts 19 produces a rotary movement of the bucket 20 about an axis defined by the shafts 19. The motor 13 is arranged to drive in both a clockwise and counterclockwise direction. Accordingly, the bucket 20 can also be driven in a clockwise and counterclockwise direction as indicated by the arrows in Figure 1 depending upon, of course, the direction in which the motor 13 is being driven at any particular instant.

The bucket 20 is shown in these figures as being substantially hemi-cylindrical in configuration; however, any other shape can be employed. The bucket 20 is arranged along its opposite edges with sharp biting edges 23 and can be referred to as being double bitted in this respect. As the bucket or scoop 20 can be driven in both a clockwise and counterclockwise direction through 360 degrees by means of the motor 13 and transmission previously described, it is possible by means of the double cutting edges 23 to utilize the apparatus fully regardless of the direction that the bucket 20 is being rotated.

A pair of hydraulic cylinders 24 are mounted on opposite sides of the tractive vehicle 10 with one end of each cylinder 24 being pivotally connected to its respective bracket 11 as indicated at 25. As is customary, a piston 26 is associated with each cylinder 24 and the end of each piston 26 is pivotally connected to its respective arm 18 as indicated at 27. A hydraulic system, including a source of fluid, motive power to force the fluid through the system and valving, is arranged in conjunction with the two cylinders 24 in a conventional manner so that the piston and cylinder assembly will operate in unison. The precise details of the hydraulic system do not form any part of the present invention and any conventional hydraulic system can be employed for this purpose. Upon operation of the cylinders 24 to force the pistons 26 out of the cylinders 24, the arms 18 will be pivoted about the shaft 12, thus raising the bucket 20 above ground level. For purposes of illustration, the bucket is shown in dotted lines as being raised by the piston and cylinder assembly to slightly above the top of the tractive vehicle 10. It is within the contemplation of the present invention that the hydraulic piston and cylinder assembly be so constructed and arranged as to swing the bucket from its ground level position at the front of the tractive vehicle, over the top of the tractive vehicle, to a ground level position at the rear of the tractive vehicle. This is illustrated by the dotted lines in Figure 1. Further, it is within the contemplation of this invention that the bucket 20 be capable of being operated either at the front of the tractive vehicle as shown, or at the rear of the tractive vehicle 10. Inasmuch as the bucket or scoop 20 is double bitted, swinging the bucket from its front position to its rear position will in no way necessitate a change in the driving transmission for the bucket.

Figure 4:
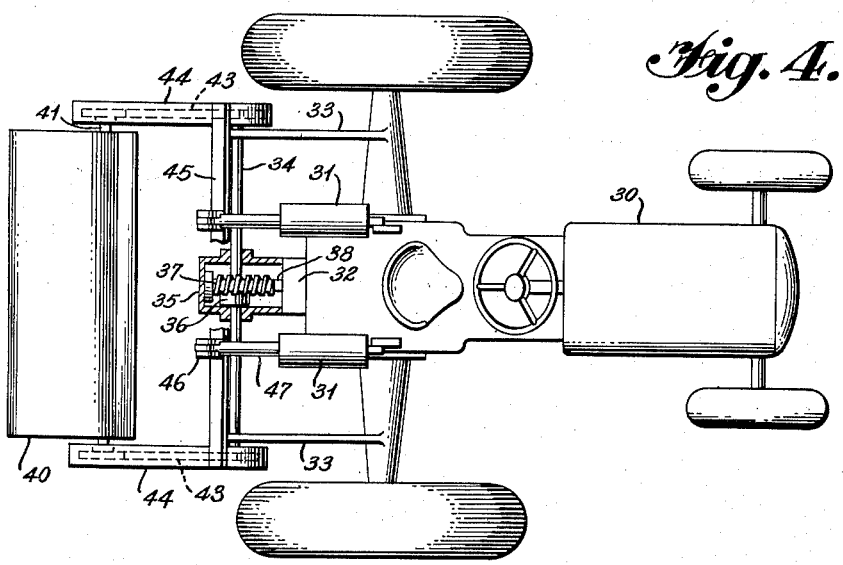
Figure 4 is a view in top plan of the apparatus shown in Figure 3.

Figures 3 and 4 illustrate the apparatus of the present invention mounted to a farm type tractor in a manner to make full use of the conventional lifts and power take-offs. This particular arrangement can be employed where a high lift for loading purposes is not necessary. The tractive vehicle is identified by the numeral 30 and is provided with hydraulic cylinders 31 or some other equivalent means which act as a lift. In order to arrange the tractive vehicle 30 with the apparatus of the present invention, the following procedure is suggested. A motor 32 is mounted to the frame of the vehicle. A pair of brackets 33 are arranged on opposite sides of the tractive vehicle to project rearwardly. Shaft 34 is bearing-supported in the brackets 33. This shaft 34 fits through a housing 35 mounted upon the tractor framework. A spider worm gear 36 is fixed to the shaft 34. A worm gear 37, in meshing engagement with the gear 36, is fixed to the end of a shaft 38, the output shaft of the motor 32. It will be appreciated, however, that the shaft 38 may be connected by suitable mechanical means to a conventional tractor power take-off. If the arrangement is of this type, then the motor 32 can be dispensed with. With the arrangement just described, operation of the tractor motor or of the motor 32 will cause rotation of the shaft 38 causing in turn rotation of the shaft 34 by means of the two gears 36 and 37. As was described with reference to Figures 1 and 2, the ends of the shaft 34 are provided with sprocket wheels 39. A bucket 40 having a shaft 41 mounted on opposite sides is similarly arranged with sprocket wheels 42 on the shafts 41. An endless chain 43 mechanically connects the two sprocket wheels 39 and 42 on each side of the tractive vehicle 30. Thus, operation of the power source results in rotation of the bucket 40. The power source, whether it be the tractor motor or the motor 32, is arranged to operate in both a clockwise and counterclockwise direction, thus imparting to the bucket 40 a rotary movement in both a clockwise and a counterclockwise direction as indicated by the arrows in Figure 3.

The sprockets 39 and 42 and chain 43 are housed within the interior of a pair of hollow arms 44 which are pivotally supported at their ends on shaft 34 and shafts 42. A tie bar 45 connects the two arms 44. A pair of links 46 are connected to the tie bar 45 and the pistons 47 of the cylinders 31. Thus drawing the pistons 47 into cylinders 31 will result in the arms 44 being pivoted about shaft 34 raising the bucket 40. Extending the pistons 47 out of the cylinders 31 will bring about the reverse movement.

Figure 5:
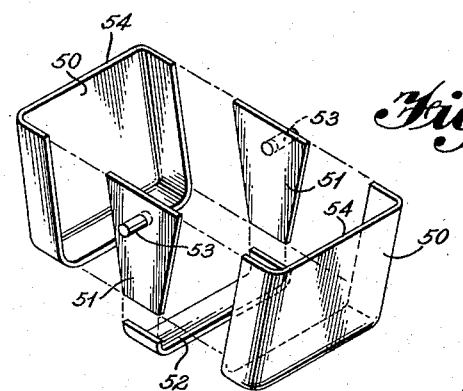
Figure 5 is an exploded view in perspective illustrating one form of the bucket.

Figures 5 and 6 illustrate a novel, inexpensive way of forming the bucket. Two regular slip scrapers 50 can be fitted together employing side fillers 51 and bottom filler 52. Shafts 53 are rigidly welded to the side fillers 51. The cutting edges for the bucket are identified by the numeral 54. The several components that go to form the bucket can be welded together or otherwise joined by any suitable means. The utility of such a construction is that drag or slip scrapers 50 are relatively inexpensive and thus the cost of forming the bucket is kept to a minimum. The completed bucket is illustrated in Figure 6.

Figure 7 shows a novel use of the apparatus of the present invention. As shown, a bucket 60 is employed in conjunction with a truck 61 to produce a self-loading dump truck. As was described with reference to Figures 1 and 2, the bucket is arranged to be rotated in both directions by means of a chain drive which is generally indicated by the numeral 62. The bucket 60 is also arranged to be elevated and lowered by means of a hydraulic system identified generally by the numeral 63. The details of both the chain drive 62 and the hydraulic system 63 are identical with the same components specifically described in Figures 1 and 2. As before, the bucket 60 is arranged with cutting edges 64 on opposite sides to enable the bucket to operate efficiently whether it is being driven in a clockwise or counterclockwise direction. The truck 61 is provided with a hydraulically operated presser foot 65. The foot is located on an arm pivoted to the frame of truck 61 and in use is pressed against the ground to keep the truck from raising up in front as the bucket is lifted from loading position to carrying position.

A hydraulic control system, for rotating the bucket, can be provided. Such a system is shown in Figure 8. 70 and 71 identify the hydraulic cylinders of the system and 72 and 73 identify the respective pistons associated with the cylinders. The remainder of the hydraulic system can be any conventional arrangement that will perform the necessary functions required. The pistons 72 and 73 are pivotally connected to the ends of a link 74 which is itself pivoted on a stud 75 rigidly fixed to any part of the tractive vehicle framework. The ends of the link 74 are also connected to the ends of a chain 76 which passes over a sprocket 77 fixed on a shaft 78. This shaft 78 is bearing-supported in brackets located on opposite sides of the tractive vehicle similar to brackets 11 shown in Figure 1. Sprocket wheels 79 are mounted on the ends of shaft 78 and endless chains 80 mechanically connect sprockets 79 with sprockets 81 fixed to opposite sides of the bucket or scoop. No bucket or scoop is shown in Figure 8; however, it will be appreciated that the bucket would be located between the sprockets 81 in the position of the shaft 82 which is shown connecting the sprockets 81. If desired, the hydraulic system to operate the piston and cylinder assembly can be arranged to operate in push-pull. Thus, when the piston 72 is moving out of the cylinder 70, the piston 73 will be moving into the cylinder 71. Hence the push force on the chain 76 exerted by the piston 72 will be balanced by the pulling force exerted on the chain 76 by the piston 73. By properly selecting the sprocket sizes and the lengths of the pistons, the control arrangement shown in Figure 8 can be constructed to cause the sprockets 81 to rotate one or more turns, thus rotating the bucket one or more turns.

The sprocket ratio between the sprockets mounted on the ends of the shaft 12 in Figure 1 and the sprockets mounted on opposite sides of the bucket 20 is 1:1. Hence, the bucket 20 will remain in its same position with respect to the ground as the bucket 20 is raised or lowered by the arms 18. The selection of a worm gear drive as shown in Figure 1 will provide a self-locking feature so that the bucket 20 will be locked in position when it is not being rotated.

Although the transmission of rotary movement to the bucket has been shown disclosed as being a chain drive, other transmissions can be employed. Thus, for example, the rotation of the bucket can be effected by a hydraulic motor, hydraulic cylinder or cylinders, or other known mechanical means such as chains, gears, etc., or combinations of any of the above.

Figure 9:
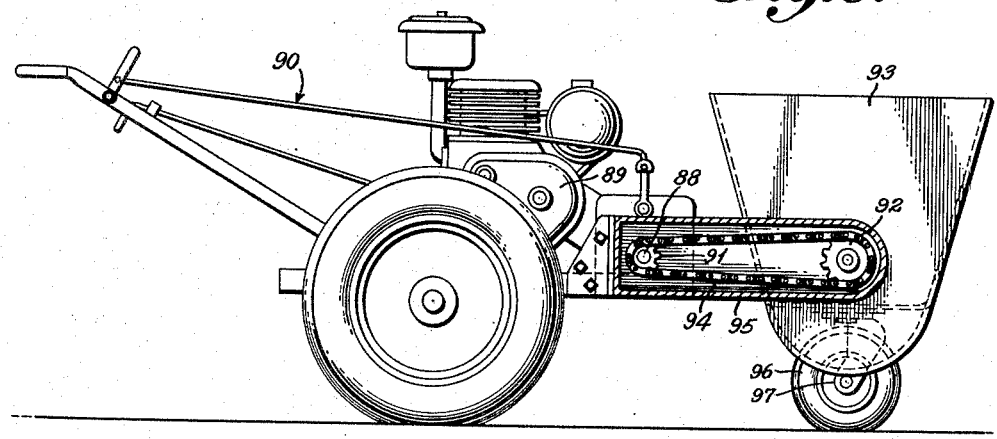
Figure 9 is a view in side elevation showing a garden tractor provided with the present invention.
Figure 10:
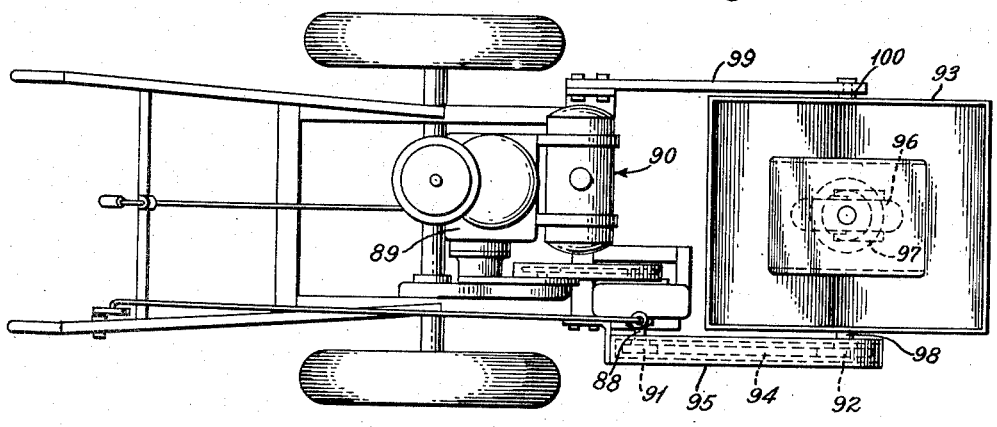
Figure 10 is a view in top plan of the apparatus of Figure 9.
Figure 11:
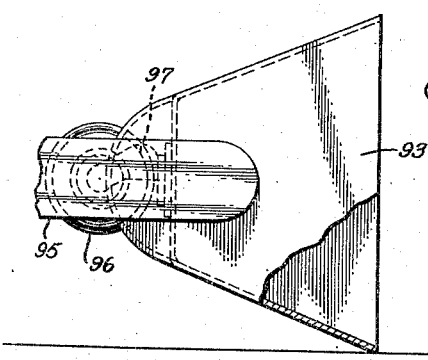
Figure 11 is a view in side elevation showing the bucket mounting.

The present invention can be adapted to a small garden-type tractor for the purpose of moving materials. Such a structure is shown in Figures 9, 10 and 11. As will be appreciated, it is not practical from a cost standpoint to provide a means to raise the bucket since to do so would make the initial outlay on a garden tractor, equipped with the present invention, so great as to take it beyond practical limits. Accordingly, in lieu of the means to raise the bucket, one or more caster wheels can be mounted on the bottom of the bucket to serve as a transporting means. Thus, when the bucket is rotated to its upright carrying position, the wheel or wheels will support the bucket and the whole can be rolled to a desired place for dumping or spreading of the material carried at which time the bucket will again be rotated to discharge the material. Referring more specifically to the drawings, a conventional garden-type tractor, designated generally by the numeral 90, is shown in Figures 9 and 10. A take-off shaft 88 from the motor 89 of the tractor extends to one side of the vehicle and is provided with a sprocket 91. Similarly, a sprocket 92 is mounted on one side of a bucket 93 by means of a stud or shaft 98 fixed normally to the side of the bucket 93. An endless chain 94 mechanically connects the pair of sprockets 91 and 92. By means of this arrangement, a transmission is effected between the prime mover of the tractor 90 and the bucket 93. A housing 95 completely encloses this transmission and supports stud 98. On the other side of the vehicle, an arm 99 is provided having one end rigidly connected to the tractor and the end supporting a stud or shaft 100 fixed to the side of bucket 93. Each of studs 98 and 100 is bearing supported in housing 98 and arm 100 respectively.

As distinguished from constructions referred to above housing 95 and arm 99 do not function as pivoting arms. A caster wheel 96 is mounted in the bottom of the bucket 93 by suitable brackets 97. It will be noted from the drawing that the caster wheel 96 is recessed in the bottom of the bucket 93. Since the bucket is not to be lifted by the housing 95 and arm 99, it is not necessary to maintain a 1:1 sprocket ratio, and as shown in the drawings, it is possible to use a reducing ratio.

Although the description has been with reference to life size tractors and the like, it will be appreciated that it is within the purview of the present invention to include any structures which embody the teachings contained herein without regard to size. Thus, the present invention is intended to cover scale models and toys, in addition to life size tractive vehicles.

An additional feature of the invention is the ability of the bucket to be loaded in either direction, while the tractive vehicle is standing still, by positioning the bucket with its opening level on the ground, applying downward pressure on the arms, exerting the full weight of the tractor on the bucket, and then causing the bucket to rotate in either direction one-half turn or 180 degrees. The downward force on the arms can be increased by raising the front wheels of the tractor from the ground.

The invention has been shown and described in detail, but various modifications in the construction, in arrangement of parts, and in the operation may be resorted to within the spirit and scope of the invention as defined by the appended claims.

What is claimed is:

1. In combination with a self-propelled tractive vehicle, a bucket, a shaft supported by and extending transversely of said vehicle, a pair of spaced parallel arms freely pivoted at their inner ends to said shaft adjacent the opposite ends thereof and freely pivoted at their outer ends to a pair of opposite ends of said bucket, a first pair of spaced sprocket wheels fixed to the opposite ends of said shaft, a second pair of spaced sprocket wheels fixed to said opposite ends of said bucket, a pair of parallel and continuous chains mechanically connecting said first and second pairs of sprockets to transmit rotary motion from said shaft to said bucket, said sprockets and said chains connecting said shaft and said bucket in a 1 to 1 driving ratio, means for pivoting said arms about said shaft whereby said bucket may be swung from ground level at one end of said vehicle to ground level at the opposite end thereof, and means for driving said shaft to cause rotation of said bucket, said bucket being rotatable through complete and partial revolutions in clockwise and counterclockwise directions, said shaft-driving means, when deenergized, locking said shaft in position so as to prevent rotation of said bucket relative to the ground as said arms are pivoted about said shaft.

2. In combination with a self-propelled tractive vehicle, a material handling receptacle having cutting edges at opposite sides thereof, a shaft supported by and extending transversely of said vehicle, a pair of spaced parallel arms freely pivoted at their inner ends to said shaft at the opposite sides of said vehicle and freely pivoted at their outer ends to a pair of opposite ends of said receptacle, said arms being of a shape and length to carry said receptacle in a vertical arc from a ground level position at either end of said vehicle to a ground level at the opposite end of said vehicle, means for swinging said arms in unison about said shaft and for holding said arms at any fixed position with respect to ground level, a first pair of spaced sprocket wheels fixed on the opposite ends of said shaft, a second pair of spaced sprocket wheels fixed to the opposite ends of said receptacle coaxial with the outer pivotal connections of said arms, a pair of continuous chains mechanically connecting said first and second pairs of sprockets, said sprockets and chains connecting said shaft and said receptacle in a 1 to 1 driving ratio, and means for rotating said shaft in clockwise and counterclockwise directions so that said receptacle can be rotated through 360° in both directions, said shaft rotating means, when deenergized, locking said shaft in position so as to prevent rotation of said receptacle relative to the ground as said arms are pivoted about said shaft.

3. In combination with an earth-handling vehicle, a material handling receptacle having cutting edges at opposite sides thereof, a pair of short shafts extending outwardly from a pair of opposite ends of said receptacle in substantially coaxial relation, an elongated pivot shaft supported by and extending transversely of said vehicle, a pair of spaced and parallel arms freely pivoted at their inner ends to said pivot shaft and freely pivoted at their outer ends to said short shafts, a first pair of spaced sprocket wheels fixed on said pivot shaft with each wheel being adjacent one end of said shaft, a second pair of spaced sprocket wheels fixed to said short shafts, a pair of spaced, parallel and continuous chains mechanically connecting said first and second pairs of sprockets for transmitting rotary motion from said shaft to said receptacle, said sprockets and chains connecting said shaft and said receptacle in a 1:1 driving relationship, means for swinging said arms in unison about said pivot shaft so as to move said receptacle to any given position from ground level at one end of said vehicle to ground level at the opposite end of said vehicle, and means for driving said shaft to cause rotation of said receptacle, said receptacle being rotatable in clockwise and counterclockwise directions from 0 to 360°, said shaft driving means, when deenergized, locking said shaft in position so as to prevent relative angular movement of said receptacle with respect to the ground as said arms are swung about said shaft.

References Cited in the file of this patent

UNITED STATES PATENTS

| | | |
|---|---|---|
| 711,806 | White | Oct. 21, 1902 |
| 1,139,690 | McDermott | May 18, 1915 |
| 1,458,775 | Nilson | June 12, 1923 |
| 2,146,807 | Ferari | Feb. 14, 1939 |
| 2,290,738 | Chadwick | July 21, 1942 |
| 2,413,661 | Stokes | Dec. 31, 1946 |
| 2,489,898 | Kluckhohn | Nov. 29, 1949 |
| 2,537,010 | Anderson | Jan. 9, 1951 |
| 2,697,529 | Hubbell et al. | Dec. 21, 1954 |